US009713373B1

(12) United States Patent
Viani

(10) Patent No.: US 9,713,373 B1
(45) Date of Patent: Jul. 25, 2017

(54) TENSION ARM LOCKING ASSEMBLY

(71) Applicant: Arthur J. Viani, Miami, FL (US)

(72) Inventor: Arthur J. Viani, Miami, FL (US)

( * ) Notice: Subject to any disclaimer, the term of this patent is extended or adjusted under 35 U.S.C. 154(b) by 0 days.

(21) Appl. No.: 15/141,118

(22) Filed: Apr. 28, 2016

(51) Int. Cl.
*A45F 5/02* (2006.01)
*F16B 2/22* (2006.01)

(52) U.S. Cl.
CPC . *A45F 5/02* (2013.01); *F16B 2/22* (2013.01)

(58) Field of Classification Search
CPC .................................... A45F 5/02; F16B 2/22
USPC ......... 24/11 P, 10 R, 11 R, 11 HC, 11 S, 3.5; 401/104
See application file for complete search history.

(56) References Cited

U.S. PATENT DOCUMENTS

| 1,609,567 | A | * | 12/1926 | Mooney | ............... | B43K 25/022 |
| | | | | | | 24/11 P |
| 2,487,312 | A | * | 11/1949 | Mottel | .................. | B43K 25/02 |
| | | | | | | 24/11 P |
| 8,245,359 | B2 | * | 8/2012 | Fujihara | ................. | B43K 25/02 |
| | | | | | | 24/11 HC |
| 8,425,135 | B2 | * | 4/2013 | Rolion | .................. | B43K 15/00 |
| | | | | | | 401/131 |

* cited by examiner

*Primary Examiner* — Robert J Sandy
*Assistant Examiner* — Rowland Do
(74) *Attorney, Agent, or Firm* — Albert Bordas, P.A.

(57) ABSTRACT

A tension arm locking assembly having a tension arm assembly with a tension arm. The tension arm has a tongue. The tension arm assembly further has a fixed base, a pivot housing, and a base. A first cavity is defined between the fixed base and the base. An actuating lever is mounted at the pivot housing. The actuating lever has a body extending to an extension edge that defines an extension interior wall. The body includes an engagement post that extends to a post base. Protruding from the engagement post is a locking protrusion. A first predetermined force is placed upon a release towards the base to place the actuating lever in the open position, and a second predetermined force is placed upon the actuating lever between the pivot housing and the extension edge to place the actuating lever in the closed position.

20 Claims, 4 Drawing Sheets

TENSION ARM LOCKING ASSEMBLY

BACKGROUND OF THE INVENTION

1. Field of the Invention

The present invention relates to accessory locking assemblies, and more particularly, to tension arm locking assemblies fixed onto articles such as pocket knives and pens, to keep them secured onto uniforms, pants, shirts, and clothing items.

2. Description of the Related Art

Applicant is not aware of any prior art that suggests the novel features of the present invention.

SUMMARY OF THE INVENTION

The instant invention is a tension arm locking assembly, comprising a tension arm assembly comprising a tension arm with a tongue. The tension arm assembly further comprises a fixed base, a pivot housing, and a base. A first cavity is defined between the fixed base and the base.

An actuating lever is mounted at the pivot housing. The actuating lever comprises a body extending to an extension edge that defines an extension interior wall. The body comprises a engagement post that extends to a post base. Protruding from the engagement post is a locking protrusion. The extension interior wall is biased against the tongue when the actuating lever is in a closed position, thereby defining a second cavity between the engagement post and the fixed base.

Extending between the extension interior wall and the locking protrusion is a post wall. The engagement post comprises at least one locking ridge. The locking protrusion extends approximately perpendicularly from the engagement post. The tension arm comprises first and second lateral edges that extend between an edge and first and second ends to define the tongue. The tongue is flexible and comprises a tongue end. The tongue end fits between the extension interior wall and the locking protrusion when the actuating lever is in the closed position. In addition, the tongue is along a same plane as the tension arm when the actuating lever is in the closed position, and the tongue end contacts the extension interior wall when the actuating lever is in an open position. The pivot housing comprises first and second upright wings. The first and second upright wings comprise first and second pin holes respectively. The first and second upright wings extend approximately perpendicularly from the pivot housing. The base extends from the pivot housing, comprises a bend, and terminates at a base end. The actuating lever comprises a pin housing having an elongated hole. The actuating lever comprises a release.

A first predetermined force is placed upon the release towards the base to place the actuating lever in the open position, and a second predetermined force is placed upon the actuating lever between the pivot housing and the extension edge to place the actuating lever in the closed position. The base contours the release. The release comprises at least one ridge. A first length between the elongated hole and the extension edge is longer that a second length between the elongated hole and the release.

It is therefore one of the main objects of the present invention to provide a tension arm locking assembly.

It is another object of this invention to provide a tension arm locking assembly that is riveted or otherwise fixed onto articles such as pocket knives, pens, laser pointers, weapons, tools, etc., to keep them secured onto uniforms, pants, shirts, clothing items, or any suitable objects and to prevent them from inadvertently falling or sliding off.

It is another object of this invention to provide a tension arm locking assembly that is volumetrically efficient for carrying, transporting, and storage.

It is another object of this invention to provide a tension arm locking assembly that can be readily assembled and disassembled without the need of any special tools.

It is another object of this invention to provide a tension arm locking assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
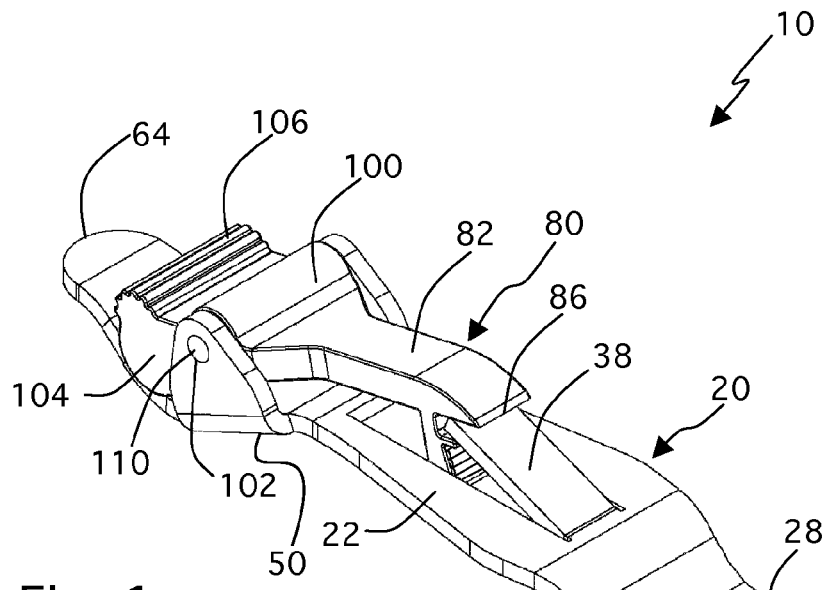
FIG. 1 is an isometric view of a tension arm locking assembly in an open position.

Referring now to the drawings, the present invention is generally referred to with numeral 10. It can be observed that it basically includes tension arm assembly 20 and actuating lever 80.

Figure 2:
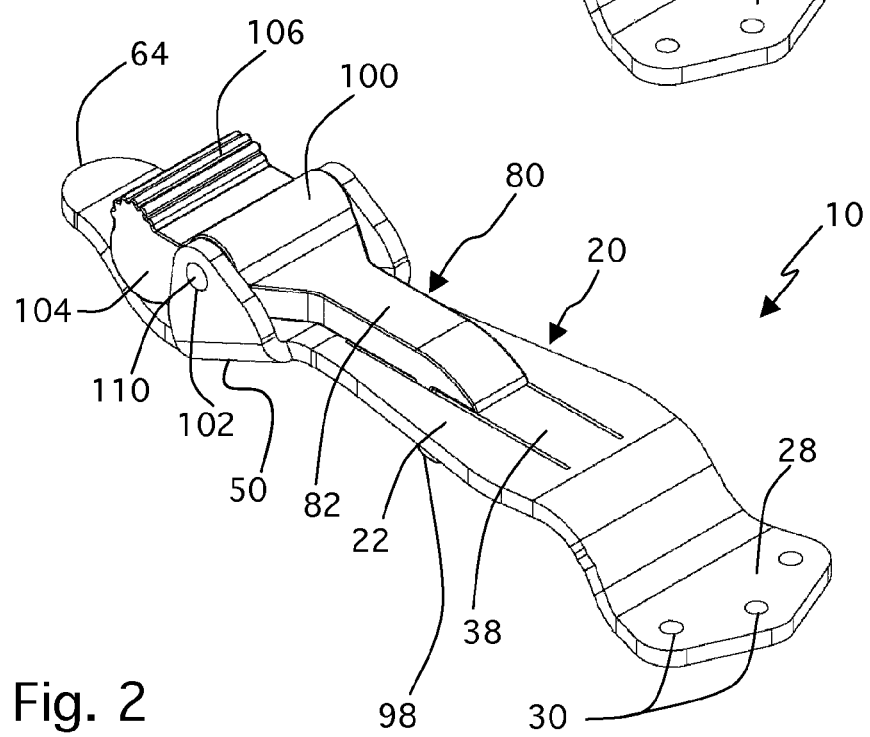
FIG. 2 is an isometric view of the tension arm locking assembly in a closed position.

As seen in FIGS. 1 and 2, tension arm locking assembly 10 comprises tension arm assembly 20, and actuating lever 80 that is mounted at pivot housing 50 with pin 110.

Figure 3:
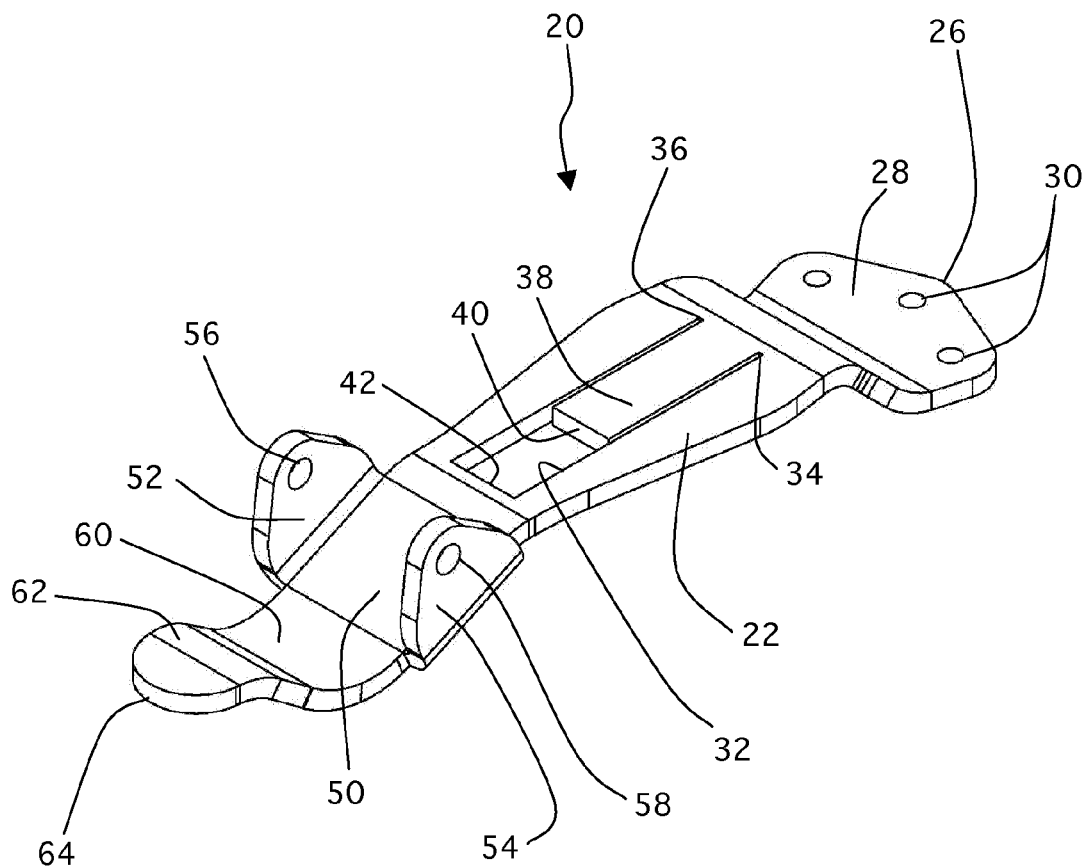
FIG. 3 is an isometric view of a tension arm assembly.

As seen in FIG. 3, tension arm assembly 20 comprises tension arm 22, fixed base 28, pivot housing 50, and base 60.

Tension arm 22 comprises first and second lateral edges 32 that extend between edge 42 and first and second ends 34 and 36 to define tongue 38. Tongue 38 is flexible and comprises tongue end 40.

Figure 6A:
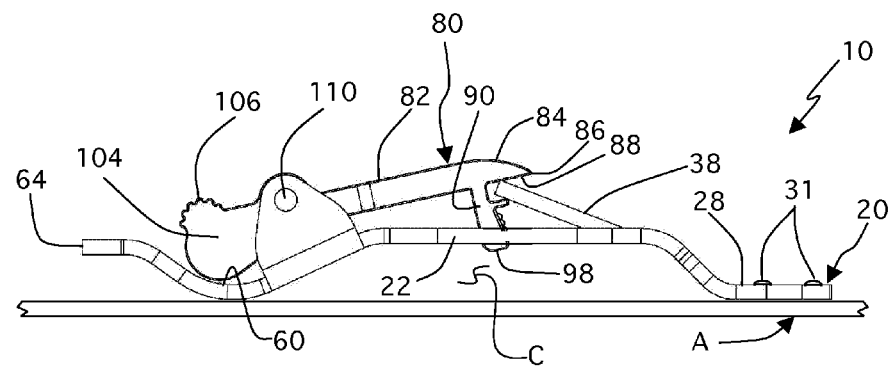
FIG. 6A is a first side elevational view of the tension arm locking assembly fixed onto an article and in the open position.
Figure 6B:
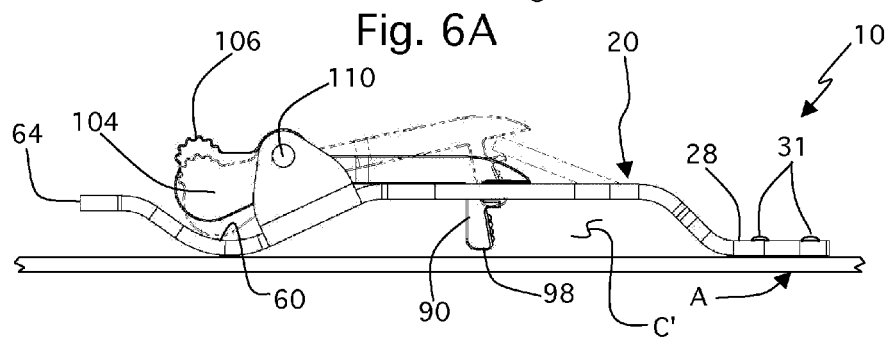
FIG. 6B is a second side elevational view of the tension arm locking assembly fixed onto the article and transitioning to a closed position.
Figure 6C:
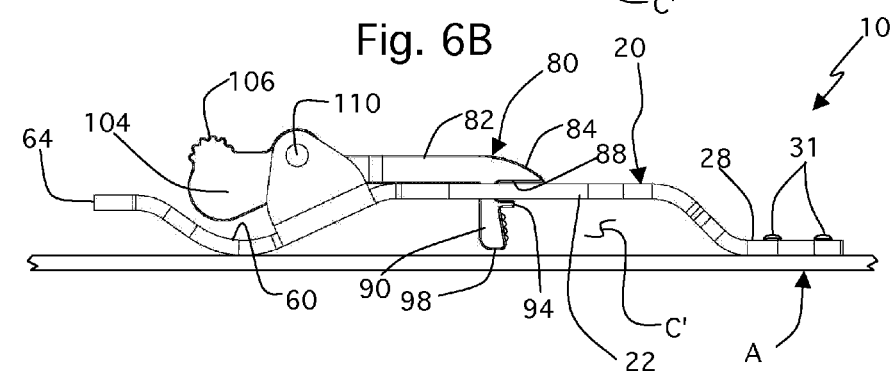
FIG. 6C is a third side elevational view of the tension arm locking assembly fixed onto the article and in the closed position.

Fixed base 28 extends to fixed base end 26 and comprises holes 30 to receive rivets 31, seen in FIGS. 6A-6C.

Pivot housing 50 comprises first and second upright wings 52 and 54 that comprise first and second pin holes 56 and 58 respectively. In one embodiment, first and second upright wings 52 and 54 extend approximately perpendicularly from pivot housing 50.

Base 60 extends from pivot housing 50, comprises bend 62, and terminates at base end 64. In a preferred embodiment, base 60 contours release 104.

Figure 4:
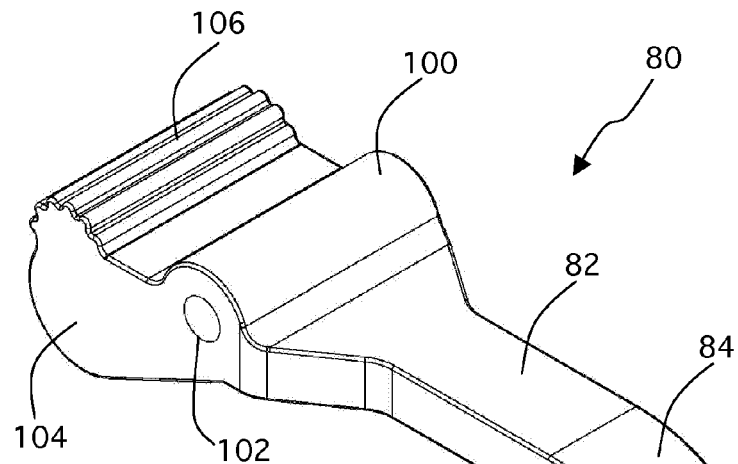
FIG. 4 is an isometric view of an actuating lever.
Figure 5:
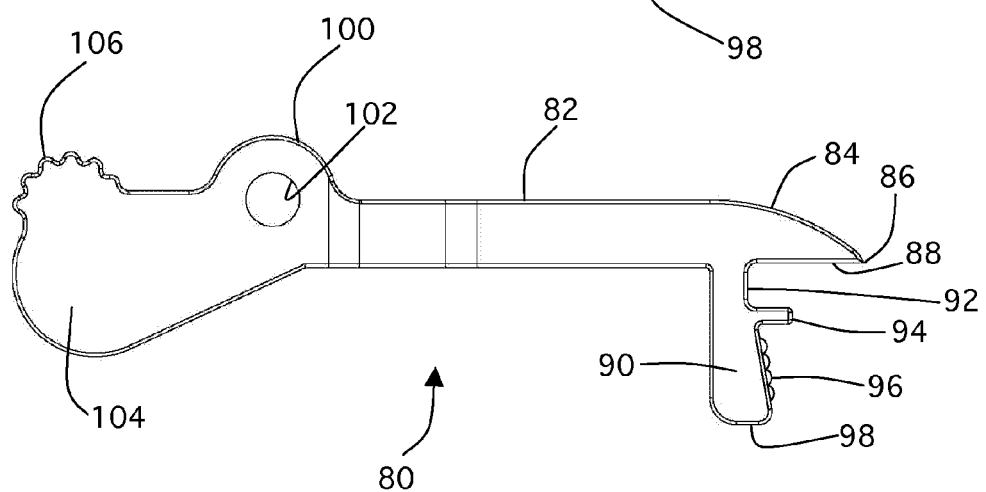
FIG. 5 is a side elevational view of the actuating lever.

As seen in FIGS. 4 and 5, actuating lever 80 comprises body 82 that extends to extension 84 and finally extension edge 86 that defines extension interior wall 88. Body 82 comprises engagement post 90 that extends to post base 98. Protruding from engagement post 90 is locking protrusion 94. Extending between extension interior wall 88 and locking protrusion 94 is post wall 92. Engagement post 90 comprises at least one locking ridge 96. Locking protrusion 94 extends approximately perpendicularly from engagement post 90.

Actuating lever 80 further comprises pin housing 100 having elongated hole 102, and release 104 that may comprise at least one ridge 106. A first length between elongated hole 102 and extension edge 86 is longer that a second length between elongated hole 102 and release 104.

As seen in FIG. 6A, tension arm locking assembly 10 is fixed with rivets 31 onto article A. Other means to fix tension arm locking assembly 10 onto article A include, but are not limited to, screws, nuts, bolts, glue, welds, tape, hook fasteners, loop fasteners, fasteners, magnets, pins, and/or adhesives. It is noted that once fixed thereon, tension arm assembly 20 comprises a tension force against article A. Article A may be any object intended to be secured onto uniforms, pants, shirts, clothing items, or any suitable objects. Article A includes, but is not limited to, a pocket knife, pen, laser pointer, weapon, tool, or any other object.

To obtain the illustrated position, a predetermined force is placed upon release 104 towards base 60. Thus, placing actuating lever 80 in an open position. In the open position, tongue end 40 contacts extension interior wall 88, and cavity C is defined between fixed base 28 and base 60. In the open position, a lapel or section of any uniform, pant, shirt, clothing item, or any suitable object, not illustrated, is slid between base 60 and article A.

As seen in FIGS. 6B and 6C, once the lapel or section from the any uniform, pant, shirt, clothing item, or any suitable object is within cavity C and biased towards fixed base 28, a predetermined force is placed upon actuating lever 80 between pivot housing 50 and extension edge 86 to place actuating lever 80 in the closed position. In the closed position, engagement post 90 traps the lapel or section within cavity C' and therefore prevents article A from inadvertently falling or sliding off from the uniform, pant, shirt, clothing item, or any suitable object. In the closed position, tongue end 40 fits between extension interior wall 88 and locking protrusion 94. Furthermore, when actuating lever 80 is in the closed position and in a preferred embodiment, tongue 38 is along a same plane as tension arm 22.

As best seen in FIG. 6C, extension interior wall 88 is biased against tongue 38 when actuating lever 80 is in the closed position. Thereby defining cavity C' between engagement post 90 and fixed base 28.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tension arm locking assembly, comprising:
   A) a tension arm assembly comprising a tension arm with a tongue, said tension arm assembly further comprises a fixed base, a pivot housing, and a base, a first cavity is defined between said fixed base and said base; and
   B) an actuating lever mounted at said pivot housing, said actuating lever comprises a body extending to an extension edge that defines an extension interior wall, said body comprises an engagement post that extends to a post base, protruding from said engagement post is a locking protrusion, said extension interior wall is biased against said tongue when said actuating lever is in a closed position thereby defining a second cavity between said engagement post and said fixed base.

2. The tension arm locking assembly set forth in claim 1, further characterized in that extending between said extension interior wall and said locking protrusion is a post wall.

3. The tension arm locking assembly set forth in claim 1, further characterized in that said engagement post comprises at least one locking ridge.

4. The tension arm locking assembly set forth in claim 1, further characterized in that said locking protrusion extends approximately perpendicularly from said engagement post.

5. The tension arm locking assembly set forth in claim 1, further characterized in that said tension arm comprises first and second lateral edges that extend between an edge and first and second ends to define said tongue.

6. The tension arm locking assembly set forth in claim 1, further characterized in that said tongue is flexible.

7. The tension arm locking assembly set forth in claim 1, further characterized in that said tongue comprises a tongue end, and said tongue end fits between said extension interior wall and said locking protrusion when said actuating lever is in said closed position.

8. The tension arm locking assembly set forth in claim 1, further characterized in that said tongue is along a same plane as said tension arm when said actuating lever is in said closed position.

9. The tension arm locking assembly set forth in claim 1, further characterized in that said tongue comprises a tongue end, and said tongue end contacts said extension interior wall when said actuating lever is in an open position.

10. The tension arm locking assembly set forth in claim 1, further characterized in that said pivot housing comprises first and second upright wings.

11. The tension arm locking assembly set forth in claim 10, further characterized in that said first and second upright wings comprise first and second pin holes respectively.

12. The tension arm locking assembly set forth in claim 10, further characterized in that said first and second upright wings extend approximately perpendicularly from said pivot housing.

13. The tension arm locking assembly set forth in claim 1, further characterized in that said base extends from said pivot housing, comprises a bend, and terminates at a base end.

14. The tension arm locking assembly set forth in claim 1, further characterized in that said actuating lever comprises a pin housing having an elongated hole.

15. The tension arm locking assembly set forth in claim 14, further characterized in that said actuating lever comprises a release.

16. The tension arm locking assembly set forth in claim 15, further characterized in that a predetermined force is placed upon said release towards said base to place said actuating lever in said open position.

17. The tension arm locking assembly set forth in claim 15, further characterized in that said base contours said release.

18. The tension arm locking assembly set forth in claim 15, further characterized in that said release comprises at least one ridge.

19. The tension arm locking assembly set forth in claim 15, further characterized in that a first length between said elongated hole and said extension edge is longer that a second length between said elongated hole and said release.

20. The tension arm locking assembly set forth in claim 1, further characterized in that a predetermined force is placed upon said actuating lever between said pivot housing and said extension edge to place said actuating lever in said closed position.

* * * * *